(12) United States Patent
Goebel et al.

(10) Patent No.: US 6,408,259 B1
(45) Date of Patent: Jun. 18, 2002

(54) ALERT GENERATION FOR TREND PERFORMANCE ANALYSIS

(75) Inventors: Kai Frank Goebel, Ballston Lake, NY (US); David Lacey Doel, Maineville, OH (US)

(73) Assignee: General Electric Company, Schnectady, NY (US)

( * ) Notice: Subject to any disclaimer, the term of this patent is extended or adjusted under 35 U.S.C. 154(b) by 0 days.

(21) Appl. No.: 09/492,685

(22) Filed: Feb. 1, 2000

(51) Int. Cl.$^7$ ................................................. G06F 11/00
(52) U.S. Cl. ....................... 702/183; 702/182; 702/185; 702/104; 701/29; 701/34; 701/100
(58) Field of Search ................................. 702/183, 182, 702/185, 179, 104; 701/34, 35, 40, 29, 99, 100, 106; 706/900, 905, 906

(56) References Cited

U.S. PATENT DOCUMENTS

| | | |
|---|---|---|
| 4,037,782 A | 7/1977 | Jackson |
| 5,018,069 A | 5/1991 | Pettigrew |
| 5,263,120 A | 11/1993 | Bickel |
| 5,406,502 A | 4/1995 | Haramaty et al. |

OTHER PUBLICATIONS

"Fuzzy K–Nearest Neighbor Algorithm" By J. Keller, Et Al, IEEE Trans. Syst. Man. Cybern, vol. SMC–15, No. 4, Jul./Aug. 1985, pp. 580–585.

Sensa Technologies, Inc. Home Page, 1998, Internet Address: http://www.jenanet.com/index.htm, 28 pages.

"Ultra–High–Tech Monitoring" Software That Learns by Greg Napert, Aircraft Maintenance Technology, Mar. 1998, pp. 48–52.

"Enhancing Aircraft Engine Condition Monitoring" By M. Fernandez–Montesinos, Et Al, IFAC Emerging Intelligent Control Technologies, Hong Kong, 1994, pp. 161–166.

"Novel Self–Learning Fault Detection System for Gas Turbine Engines" By VC Aptel, Et Al., Univ. of Sheffield, United Kingdom, ACCC International Conference, pp. 867–872.

"Troubleshooting CFM 56–3 Engines for the Boeing 747 Using CBR and Data–Mining" by Richard Heider, CFM International, pp. 512–518.

"Contextual Normalization Applied to Aircraft of Gas Turbine Engine Diagnosis" by P. Turney, Et Al, Journal of Appl. Intel. 3, 1993, pp. 109–129.

"Reasoning Technology for the On–Board Maintenance System" by L. Reibling, Et Al, 1993 IEEE, pp. 930–936.

"A Performance Assessment of a Case–Based Diagnostic System for Aircraft Malfunctions" by Karamouzis, Et Al, pp. 71–78.

"Case–Based Approach to Handling Aircraft Malfunctions" by S. L. Karamouzis, Et Al, SPIE. vol. 1963, Appl. of Art. Intell. 1993, pp. 274–284.

ETS MBR Application of Model–Based Reasoning to Gas Turbine Diagnostics by Winston, Et Al, 1995 Amer. Assoc. for Art Intell., pp. 67–77.

Primary Examiner—Kamini Shah
Assistant Examiner—Hien Vo
(74) Attorney, Agent, or Firm—David C. Goldman; Jill M. Breedlove

(57) ABSTRACT

This invention provides an improved alert generation system and method for trend performance analysis. A multi-variate abnormal condition detector normalizes data obtained from a process and classifies the data in a multi-dimensional space defined for the variables in the process. The normalized data are classified into either a normal or abnormal class. An alert evaluator evaluates the data classified in the abnormal class and determines whether the data are a true alert or a false alert. In another embodiment, the multi-variate abnormal condition detector and alert evaluator are used in parallel with a trend performance analysis tool to validate alerts generated therefrom.

72 Claims, 11 Drawing Sheets

ALERT GENERATION FOR TREND PERFORMANCE ANALYSIS

BACKGROUND OF THE INVENTION

This invention relates generally to trend performance analysis and more particularly to detecting an abnormal condition in a multi-sensor environment using a composite change score.

Trend performance analysis is typically used to monitor and analyze sensor data and derived values for a technical process. One type of technical process where trend performance analysis is used is with aircraft engines. In this example, engine data are sampled from an airplane at different times of the flight and transmitted to a ground station. The data are collected and distributed to an aircraft engine expert for that particular airplane fleet. The data are preprocessed and evaluated by a trend performance analysis tool. In particular, the trend performance analysis tool monitors a multitude of engine variables. Data for each variable are compared against trending baseline data. If the data for a particular variable exceed a predetermined threshold limit and the data are-not considered to be outliers, then the trend performance analysis tool issues an alert. Typically, the predetermined alert threshold limit for each variable is set at a level that is below a limit that would generate a fault warning flag in the cockpit of the airplane. In particular, the predetermined alert threshold limit for each variable is at a level that would create an awareness of a potential problem before it turns into an event that could result in a revenue loss for the airplane. Examples of potential revenue loss situations are a grounding of an airplane, damage to an engine, departure delay, etc.

After the trend performance analysis tool issues an alert, the aircraft engine expert examines trend charts for each of the variables in order to determine if an event has truly occurred which warrants further action. If the data in any of the trend charts are suspicious, then the aircraft engine expert notifies the fleet management of that particular airplane and suggests actions to further diagnose and/or actions to correct any causes for the alert. Examples of possible actions are boroscoping the engine, engine washing, overhauling the engine, etc. A problem with this approach is that many alerts are generated which are false and do not warrant further diagnostic or corrective actions. There are a number of reasons for the high number of false alerts being issued. One is that the data quality varies considerably between different engines. Another reason is that predetermined alert threshold levels for a variable are preset globally and not selected for an individual airplane. Other reasons for issuing an excessive number of alerts are noise generated from poorly calibrated and deteriorating sensors, the use of faulty data acquisition systems, and slow wear of the engine which results in a constant change of normal operating conditions.

If too many alerts are generated, then the aircraft engine expert has to constantly examine the trend charts to eliminate the false alerts from the true alerts. Constantly examining the trend charts becomes a very time consuming task when there is a large number of engines to monitor, as typically is the case for a large fleet of airplanes. In addition, the expert's senses may become dulled to the true alerts due to the large amount of false positive alerts. Therefore, there is a need for a mechanism that alerts the expert of a truly suspicious situation, produces less false positive alerts and assists in reducing the excessive number of false alerts generated by a trend performance analysis tool without sacrificing the ability to detect true alerts.

SUMMARY OF THE INVENTION

This invention is able to find a truly suspicious situation by using abnormal condition detection along with a multi-dimensional approach to classify data. Abnormal condition detection does not try to classify an observation into particular faults. Rather, abnormal condition detection bins data into only two classes, "normal" and "abnormal". In this invention, an abnormal engine condition is detected by assessing data for several related engine variables and classifying the data as either normal or abnormal.

In order to assess the state of the engine, the data are evaluated to determine an alert level. In this evaluation, data for the related engine variables are examined on a multi-variate level to detect shifts. Generally, the more variables that are shifting at the same time, the more likely that there has been a suspicious change. A persistency checker increases a vigilance level as more suspicious data are encountered and decreases the level if normal data are encountered. The effect of the persistency checker is that alerts are not reported hastily. Rather the persistency checker requires a confirmation before increasing the level of alertness. Thus, outliers from both the normal class to the abnormal class and from the abnormal class to the normal class do not reset the alerting mechanism inadvertently. A composite alert score generator determines an alert score for each of the related engine variables based on the vigilance levels noted by the persistency checker. The composite alert score generator aggregates the alert scores for each of the related variables and then issues an alert when the vigilance level for the aggregate score surpasses a preset threshold.

In accordance with this invention, there is provided a system and a method for generating an alert from data obtained from a process. In this embodiment, a normalizer normalizes the data. A classifier classifies the normalized data in a multi-dimensional space defined for a plurality of variables in the process. The normalized data are classified into a normal class or an abnormal class defined in the multi-dimensional variable space. The normal class is indicative of normal operating conditions for the process and the abnormal class is indicative of potential alert conditions in the process. An alert level evaluator evaluates a vigilance level of the classified data for related variables. The alert level evaluator increases the vigilance level following a suspicious data reading classified in the abnormal class and decreases the vigilance level following a data reading classified in the normal class. An alert score generator generates an alert score for each of the related variables according to the vigilance level.

In accordance with another embodiment of this invention, there is provided a system and method for validating an alert generated from a trend performance analysis tool used to monitor data obtained from a process. In this embodiment, a normalizer normalizes the data monitored by the trend performance analysis tool. A classifier classifies the normalized data in a multi-dimensional space defined for a plurality of variables in the process. The normalized data are classified into-a normal-class or an abnormal class defined in the multi-dimensional variable space. The normal class is indicative of normal operating conditions for the process and the abnormal class is indicative of potential alert conditions in the process. An alert level evaluator evaluates a vigilance level of the classified data for related variables. The alert level evaluator increases the vigilance level following a suspicious data reading classified in the abnormal class and decreases the vigilance level following a data reading classified in the normal class. An alert score generator generates an alert score for each of the related variables according to the vigilance level. The alert generated from the trend performance analysis tool is valid if the alert score satisfies a predetermined score.

DETAILED DESCRIPTION OF THE INVENTION

Figure 1:
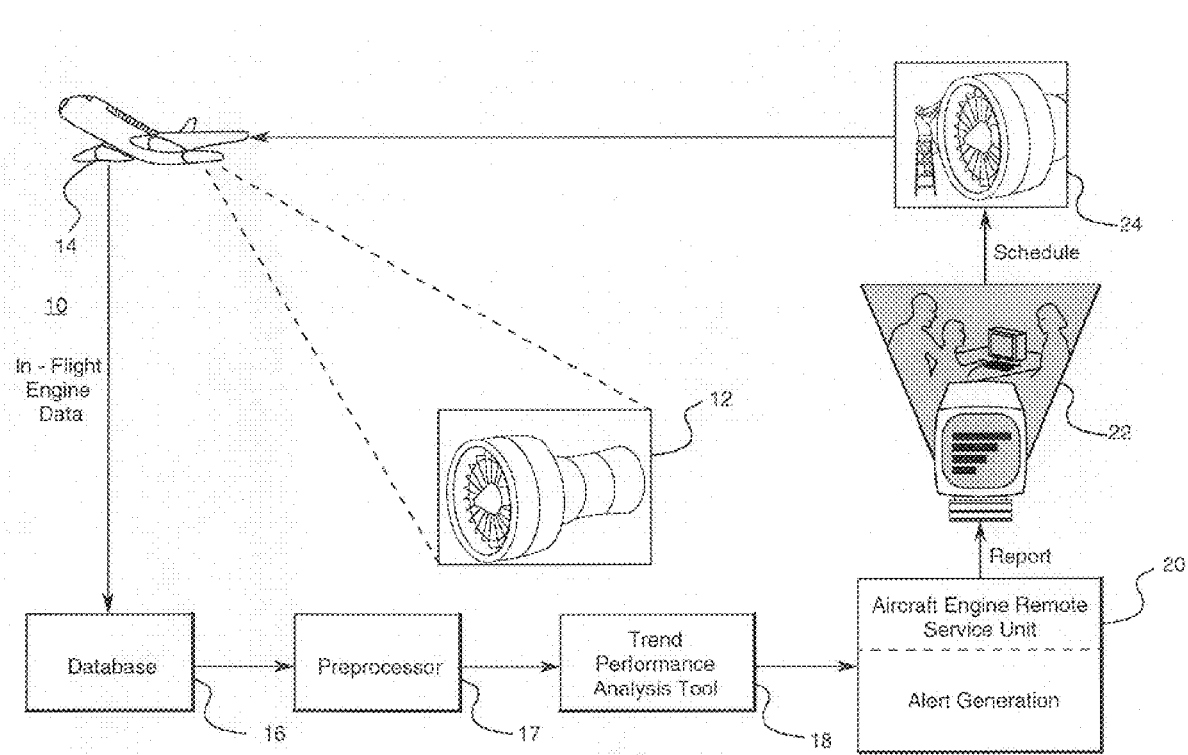
FIG. 1 shows a block diagram of a system for monitoring and maintaining an aircraft engine according to the prior art.

The improved alert generation associated with this invention is described with reference to an aircraft engine used by an aircraft such as an airplane, however, other aircraft (e.g., a helicopter) are possible. Although this invention is described with reference to an aircraft engine, the invention can be used in conjunction with any system such as a turbine, a power system, a locomotive, a chemical or mechanical process plant, or another process which generates sensor data where it is desirable to monitor or diagnose system behavior. FIG. 1 shows a block diagram of a system 10 for monitoring and maintaining an aircraft engine 12 according to the prior art. In this system 10, engine data are sampled from the aircraft engine 12 from an airplane 14. The engine data are sampled at different times of the flight such as during the take-off, the climb and the cruise either continuously or in snapshots. The engine data are transmitted during or after the flight to a centralized data center and stored in a database 16. The data are then collected, distributed and preprocessed by a preprocessor 17.

After preprocessing, data features are evaluated by a trend performance analysis tool 18, which monitors a multitude of engine variables. Data features are raw data that have been cleaned of errors not compatible with further processing in the system or data which have been transformed to yield information beyond the raw data (e.g., statistical properties, transformations into a different domain, principle component analysis, etc.) The trend performance analysis tool 18 may be any general-purpose trend performance analysis tool that can monitor on-line sensor data, variables, and features of a technical process. Features are compared against trending baseline features. If the feature for a particular variable exceeds a predetermined threshold limit, then the trend performance analysis tool 18 issues an alert to a remote service unit 20. An alert is indicative of a failure, a fault condition, or symptoms of an incipient failure condition. An aircraft engine expert located at the remote service unit monitors trend charts and alerts generated by the trend performance analysis tool 18. The aircraft engine expert then decides whether a true alert exists and generates a report to a fleet management unit 22. If the report suggests that remedial or diagnostic actions are needed, then personnel at the fleet management unit 22 prepare a schedule of the suggested actions. Maintenance personnel 24 then perform the actions (e.g., boroscoping the engine, engine washing, overhauling the engine) as set forth in the schedule prepared by the fleet management unit 22.

As mentioned above, one of the problems associated with the system 10 for monitoring and maintaining an aircraft engine according to the prior art is that there are many alerts generated from the trend performance analysis tool 18 which are false and do not warrant further diagnostic or corrective actions. When too many alerts are generated the aircraft engine expert has to constantly examine the trend charts to distinguish the false alerts from the true alerts. Constantly examining the trend charts is a very time consuming task for the aircraft engine expert, since the expert typically has the responsibility of monitoring a large number of engines for a particular fleet. In addition, it may cloud the expert's attentiveness for true alerts.

Figure 2:
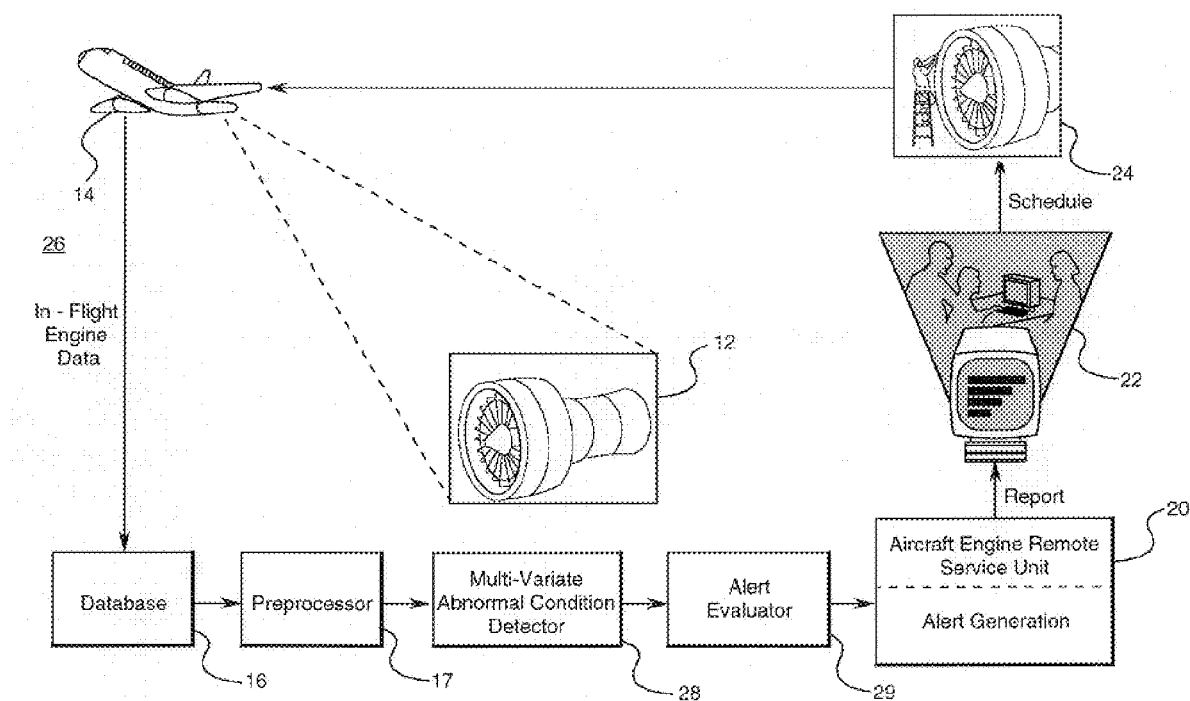
FIG. 2 shows a block diagram of a system for monitoring and maintaining an aircraft engine according to this invention.

FIG. 2 shows a block diagram of a system 26 for monitoring and maintaining an aircraft engine according to this invention. In this embodiment, alerts are detected by using a multi-variate abnormal condition detector 28. First, the multi-variate abnormal condition detector 28 estimates some statistical properties of the preprocessed data from the aircraft engine 12 and smoothes the estimated properties to follow slow drifts that develop over time. Then the multi-variate abnormal condition detector 28 normalizes the data. In particular, variables defined for the aircraft engine are normalized individually. The aircraft engine variables that are normalized are delta exhaust gas temperature (dEGT), which is the deviation from the baseline EGT, fuel flow (WF), core speed (N2), and EGT divergence, divEGT, which is the difference of the EGT between the raw EGT of the engine in question and the mean of raw EGT of all engines. Other variables may be normalized such as WF divergence, divWF, which is the difference of the WF between the WF of the engine in question and the mean of WF of all engines, and N2 divergence, divN2, which is the difference of the N2 between the N2 of the engine in question and the mean of N2 of all engines. These variables are illustrative of some of the aircraft engine variables that can be normalized in this invention and are not an exhaustive list. The multi-variate abnormal condition detector 28 assesses the normalized data for the aircraft engine variables simultaneously, instead of one process variable at a time. In particular, the multi-variate abnormal condition detector 28 classifies the normalized data in a multi-dimensional space defined for the plurality of engine variables. The normalized data are classified into a normal class or an abnormal class defined in the multi-dimensional variable space. The normal class is indicative of normal operating conditions for the aircraft engine and the abnormal class is indicative of potential alert conditions in the engine. Below is a more detailed explanation of the statistical property estimation, smoothing, normalization and classification steps performed by the multi-variate abnormal condition detector 28.

The system 26 in FIG. 2 also comprises an alert evaluator 29, which evaluates the classified data and determines whether the data are a true alert or a false alert. In particular, the alert evaluator 29 generates an alert level of the data. More specifically, the alert evaluator 29 generates a vigilance level of the data for each reading for related variables. Related variables could be dEGT and divEGT, WF and divWF and N2 and divN2. Each vigilance level is indicative of suspicious data. If suspicious data are encountered, the vigilance level for the reading is increased by a notch. If the following data reading are normal, then the vigilance is decreased by one notch. The alert evaluator 29 then generates an alert score based on the vigilance level for each of the related variables. Afterwards, the alert evaluator 29 aggregates the alert scores into a composite alert score for the individual related variable pairs. Below is a more detailed explanation of the steps performed by the alert evaluator 29.

Figure 3:
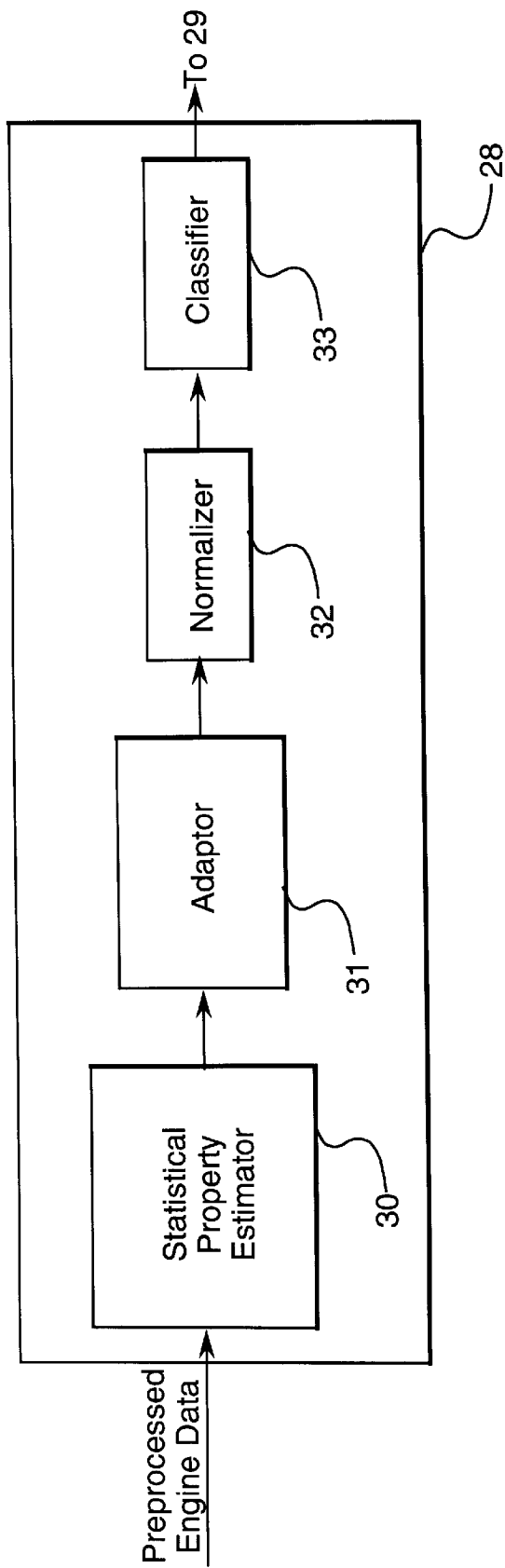
FIG. 3 shows a more detailed view of the multi-variate abnormal condition detector shown in FIG. 2.

FIG. 3 shows a more detailed view of the multi-variate abnormal condition detector 28. The multi-variate abnormal condition detector 28 receives preprocessed engine variable data from the preprocessor 17. The preprocessor 17 ensures that there are no missing data entries for any particular variable and that the data are new data (i.e., there are no repeated entries from earlier runs). Should the preprocessor 17 find any old data, it will disregard those and take only those which are found to be new. This is done to prevent repeated processing of the same data. The date of the data is determined by comparing incoming data against a date/time stamp stored for the last flight processed for each engine. That date/time stamp is later updated as more data are obtained.

Referring to FIG. 3, the multi-variate abnormal condition detector 28 comprises a statistical property estimator 30 that estimates some statistical properties of the preprocessed data such as mean and standard deviation of the data as well as the mean of the normal region. Preferably, the statistical property estimator 30 estimates the mean and standard deviation on the "fly" using only the mean of the previous calculation, the size of the virtual window, the standard deviation of the previous calculation and a temporary variable. In particular, the mean estimation is determined as:

$$\hat{x}(k) = \hat{x}(k-1) + \frac{(x(k) - \hat{x}(k-1))}{n} \quad (1)$$

wherein x(k) is the current data point at time k;

¯x(k) is the estimated mean at time k;

¯x(k−1) is the estimated mean at time k−1; and n is the virtual window site.

The estimation for the standard deviation is determined as:

$$\hat{\sigma}(k) = \sqrt{|s(k) - +e,\text{ovs} +e,\text{cirx}+ee\ (k)^2|} + ee \quad (2)$$

wherein $\hat{\sigma}(k)$ is the estimation of the standard deviation at time k;

s(k) is an auxiliary variable; and

¯x(k) is the estimated mean at time k

The auxiliary variable "s" for the standard deviation is estimated by the following:

$$s(k) = s(k-1) + \frac{x(k)^2 - s(k-1)}{n} \quad (3)$$

wherein s(k−1) is the auxiliary variable at time k−1;

x(k) is the data point at time k; and n is the site of the virtual window.

Referring back to FIG. 3, the multi-variate abnormal condition detector 28 also comprises an adaptor 31 for smoothing the statistical properties estimated by the statistical property estimator 30. The purpose of the adaptor 31 is to smooth the estimation for the mean and standard deviation and to follow slow drifts over time. Slow drifts are a function of mechanical, chemical, and thermal wear and is much smaller than alert conditions. Preferably, the adaptor 31 is essentially an exponential weighted moving average (EWMA) filter which sits on top of the statistical property estimator. In this invention, the smoothing parameter, alpha, associated with the adaptor 31 can be designed to react to changes faster or less fast. In addition to the smoothing parameter, adaptor 31 uses a window size "n" to also determine the smoothness of the adaptation. The larger the window, the smoother the adaptation. The adaptor 31 is governed by the following:

$$\overline{+e,\text{otl x}+ee}\ (k) = \alpha\overline{+e,\text{otl x}+ee}\ (k-1) + (1-\alpha)\overline{+e,\text{cirx}+ee}\ (k) \quad (4)$$

where $\overline{+e,\text{otl x}}(k)$ is the smoothed mean $\alpha$ is the smoothing constant and the equation for adapting the standard deviation is defined as:

$$\sigma(k) = \alpha\sigma(k-1) + (1-\alpha)\hat{\sigma}(k) \quad (5)$$

where $\sigma(k)$ is the smoothed standard variation

The multi-variate abnormal condition detector 28 also comprises a normalizer 32 that normalizes the smoothed engine variable data. The normalizer 32 takes the data and centers them around a chosen center point that can be any point in the feature space. For example, for a two-dimensional space, it could be the point (0,0) or point (0.5, 0.5), etc. The normalizer 32 then uses a user-specified variance to perform the normalization for each variable. The normalizer 32 normalizes the engine data individually for each engine variable (i.e., dEGT, WF, N2, and EGT divergence) according to normalizing parameters. In particular, a user specified, predetermined number of initial data readings for each variable which are validated to be "normal" (e.g., through supervision) are used to obtain the normalization parameters. All following data readings are then scaled according to the normalization parameters. While several normalization procedures can be used, the preferred one is governed by the equation:

$$x_{normalized} = \frac{x - x_{min}}{x_{max} - x_{min}}, \quad (6)$$

wherein $x_{normalized}$ is the normalized variable;

x is the raw reading;

$x_{max}$ is the maximum value of the data computed by:

$x_{max}$=mean+stretch_radius·scale·sigma;

stretch_radius is a variable denoting the radius which is larger during the initialization period (governed by first_n) and shrinks to the unit circle during that initialization period. It is calculated by:

$$\text{stretch\_radius} = \max\left(1, \text{current\_counter} \cdot \frac{(1 - \text{init\_radius})}{\text{first\_n} - 1} + \text{init\_radius} - \frac{(1 - \text{init\_radius})}{\text{first\_n} - 1}\right)$$

wherein current_counter is the number of times the process was run after initialization;

init_radius is the initial radius (which will be bigger than the unit circle);

first_n is the initialization period, expressed in number of runs of the system;

sigma is the number of standard deviations around the mean; this number determines how much variation the data is allowed without being classified as an abnormal condition; and $x_{min}$ is the minimum value of the data within the initialization set, computed by:

$$x_{min} = \text{mean} - \text{stretch\_radius} \cdot \text{scale} \cdot \text{sigma} \quad (8)$$

Normalization of the engine data allows a comparison of data which are subject to different calibration or constraints like minor design variations or material variations. In the case of the aircraft engine example, it allows comparison of different aircraft engines that are in different states of wear and that have differently tuned variables. An underlying basis of the normalization is that particular failures have directional information, which is retained over different engines and even engine families. For example, a variable bleed variable (VBV) failure results in increases of dEGT, WF, N2, and EGT divergence. On the other hand, a failure of a different component, e.g., a failure of a C-clip, will result in an increase of dEGT, WF, and EGT divergence, while N2 will drop. These characteristic changes can be seen regardless of the differences in wear or other variations mentioned above. The normalization also provides a role in resetting the algorithm after engine changes, controller changes, major maintenance, etc. have been performed, which usually all involve the change of engine parameters. The normalization provides a semi-automated mechanism to calibrate the engine to new parameter settings. The first_n data points, where n is a number to be specified by the user, have to be of type "normal" and have to be verified by the user.

Figure 4:
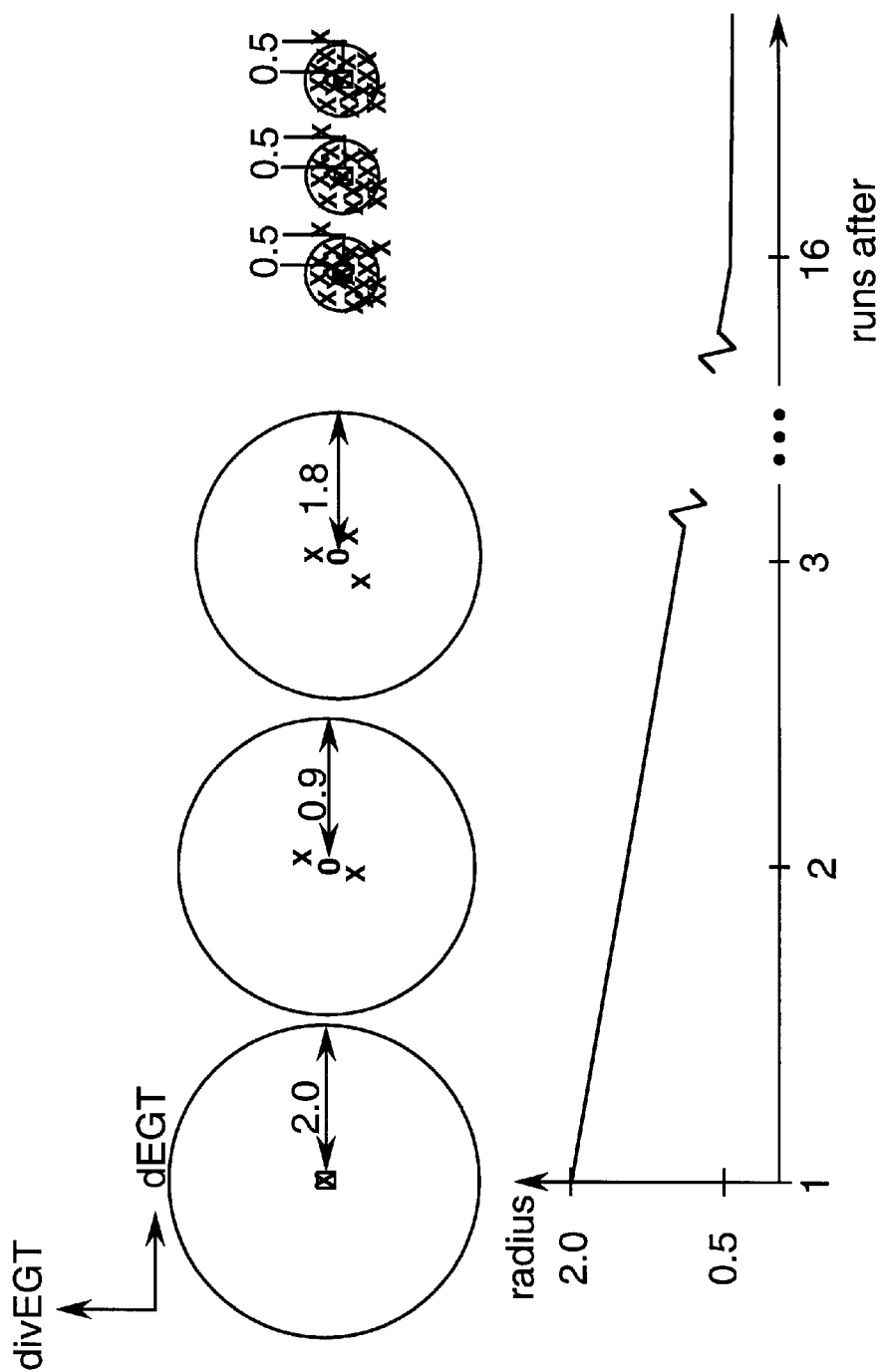
FIG. 4 shows an example depicting the initialization and normalization performed by the normalizer in the multi-variate abnormal condition detector.

If the system is re-initialized, then the data are initially allowed to take on larger variance to account for the settling process to proceed properly without misclassification. This can be envisioned as using a larger radius for the initial data, which is decreased sequentially with each new data point until a predefined radius for the variance is reached. The radius does not shrink after that. FIG. 4 shows an example depicting the initialization and normalization performed by the normalizer 32.

Referring again to FIG. 3, the multi-variate abnormal condition detector 28 also comprises a classifier 33, which classifies the normalized data in a multi-dimensional variable space defined for the aircraft engine 12. Preferably, the multi-dimensional variable space comprises the dEGT, WF, N2, divEGT, divWF and divN2. As mentioned above, the classifier 33 classifies the normalized data into a normal class or an abnormal class defined in the multi-dimensional variable space. The normal class is indicative of normal operating conditions for the aircraft engine and the abnormal class is indicative of potential alert conditions in the engine.

Figure 5:
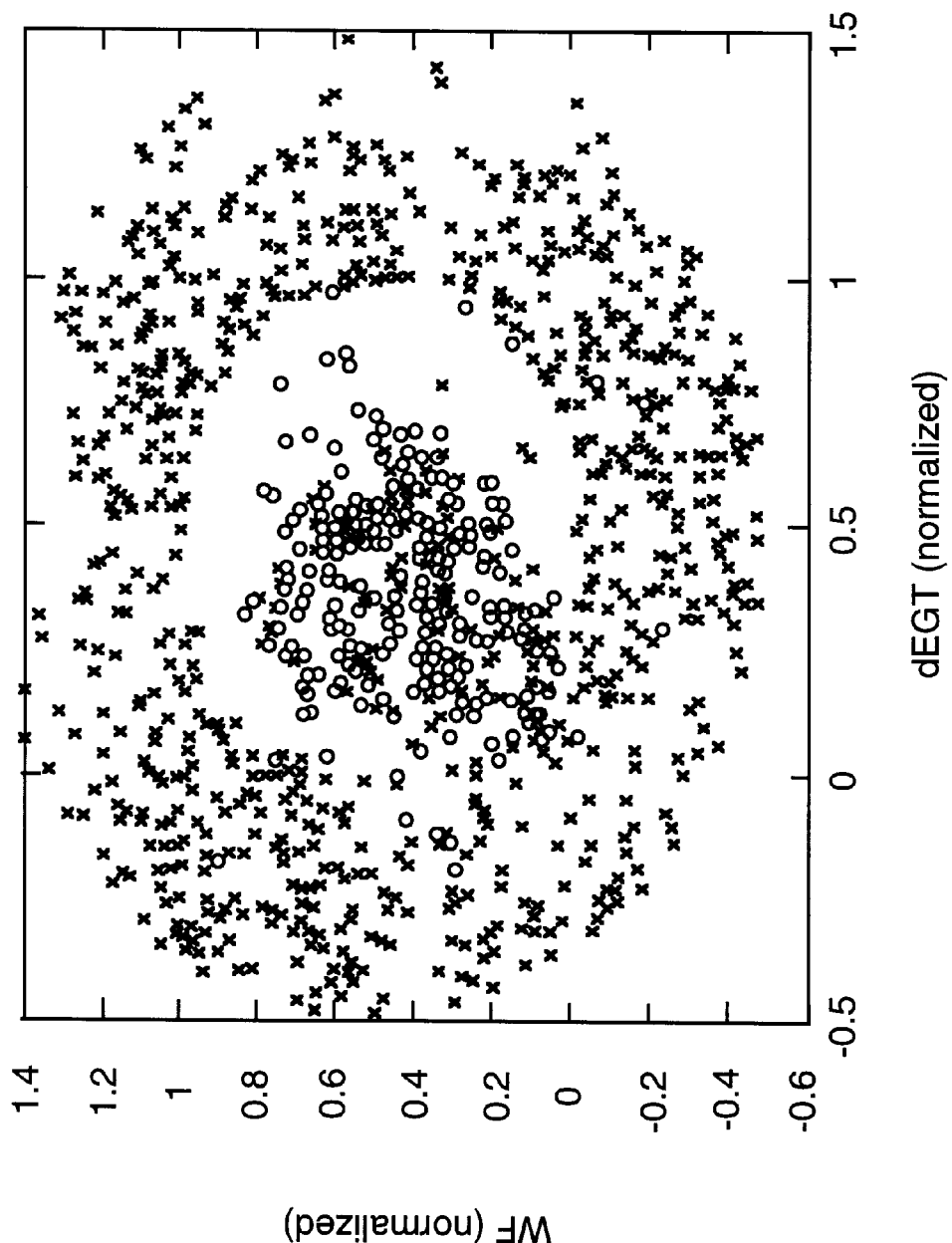
FIG. 5 shows an example of a plot of a two-dimensional classification performed according to this invention.

The classifier 33 uses a fuzzy knn (k nearest neighbor) algorithm to establish whether a measurement belongs to either the normal class or the abnormal class. Representatives for the normal class are assumed to be within a circle around the mean of the normalization and are generated accordingly. Data beyond that are considered abnormal and prototype data sets for both normal and abnormal classes are generated at the beginning of each run of performing the classification. FIG. 5 shows an example of a plot of a two-dimensional classification performed according to this invention.

The fuzzy knn algorithm finds the k closest neighbors and calculates a degree of belonging to either the normal class or abnormal class. This invention uses a fuzzy knn algorithm similar to the one disclosed in Keller et al., A Fuzzy K-Nearest Neighbor Algorithm, IEEE Transactions of Systems, Man and Cybermetrics, Vol. SMC-15, No. 4, pp. 580–585, July/August 1985, which is incorporated herein by reference. Using the fuzzy knn algorithm, the classifier 33 first finds the distance from the input vector to the closest neighbor. If the number of k neighbors has not yet been established, the closest neighbor is included in the set of k-nearest neighbors. If there are already k-nearest neighbors and the newly found neighbor is closer to the input vector than the farthest nearest neighbor, then the farthest nearest neighbor is replaced by the newly found nearest neighbor. This process is repeated until all data points are evaluated. The degree of belonging associated with this fuzzy knn algorithm is given by:

$$u_i(x) = \frac{\sum_{j=1}^{k} u_{ij}\left(\frac{1}{\|x - x_j\|^{\frac{2}{m-1}}}\right)}{\sum_{j=1}^{k}\left(\frac{1}{\|x - x_j\|^{\frac{2}{m-1}}}\right)} \quad (9)$$

where x is the data point;

u is the degree of belonging to a class (membership); and m is a tuning parameter which determines the steepness of the membership curves between the classes.

The statistical property estimator 30, adaptor 31, normalizer 32 and the classifier 33 of the multi-variate abnormal condition detector 28 are embedded in a computer such as a workstation, however, other types of computers can be used such as a mainframe, a minicomputer, a microcomputer, or a supercomputer. The algorithms performed in the statistical property estimator 30, adaptor 31, normalizer 32 and the classifier 33 are programmed in Vbasic and MATLAB, but other languages such as JAVA may be used.

Figure 6:
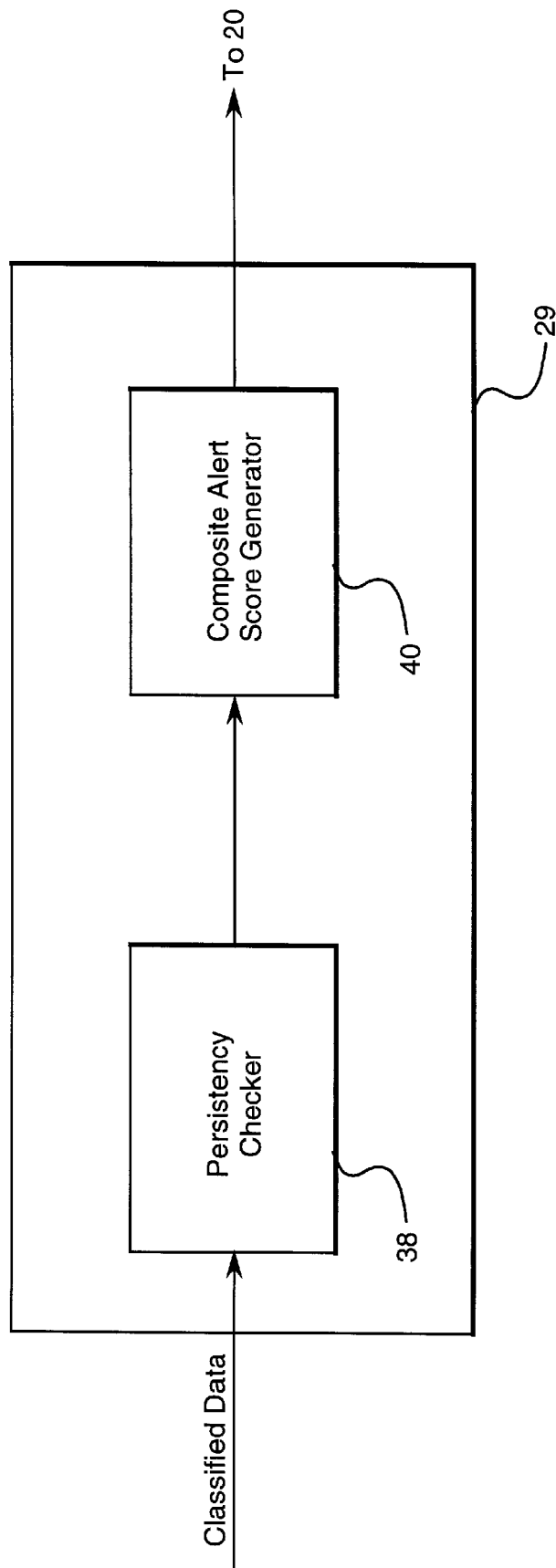
FIG. 6 shows a more detailed view of the alert evaluator shown in FIG. 2.

FIG. 6 shows a more detailed view of the alert evaluator 29. As mentioned above, the alert evaluator 29 evaluates the classified data. The alert evaluator comprises a persistency checker 38 as shown in FIG. 6. The persistency checker 38 determines the vigilance level of the data for each reading for related variables. The persistency checker 38 is preferably a digital filter, which has a dampening effect. If suspicious data are encountered, the persistency checker 38 increases a vigilance level by one notch at a time. If the following data point is normal, then the persistency checker 38 decreases the vigilance level by one notch. In this invention, the persistency checker has a user-specified alert limit that controls how much dampening is allowed. If the user-specified alert limit is reached, then the persistency checker 38 cuts off further increases and holds the vigilance at the alert limit until normal data are encountered. The alert limits work both in the positive and negative direction. The effect of the persistency checker 38 is that alerts are not reported hastily. Rather confirmation of the initial suspect data is required to increase the level of alertness. Thus, changes from the normal region to the abnormal region and from the abnormal region to the normal region do not reset the alerting mechanism immediately. In the latter case, the persistency checker 38 keeps the level of suspicion high.

Referring to FIG. 6, the alert evaluator 29 also comprises a composite alert score generator 40. The composite alert score generator 40 generates an alert score based on the vigilance level for each of the related variables. In addition, the composite alert score generator 40 aggregates the alerts found at individual directly and indirectly related feature pairs. In particular, the maximum value of all vigilances is forwarded to the aggregate score and used as the aggregate value. The objective of the composite alert score generator 40 is to report the maximum number of the alerts to enable notification of the user of any abnormal condition in any of the features.

Figure 7A:
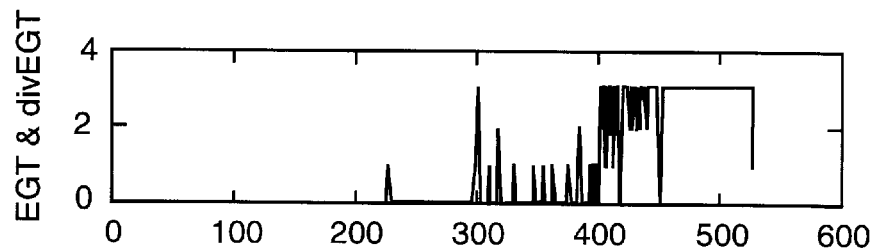
FIGS. 7a–7d show an example of plots used to determine the composite alert score according to this invention.
Figure 7B:
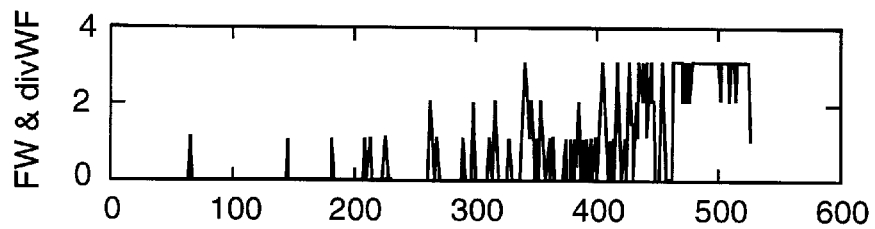
Figure 7C:
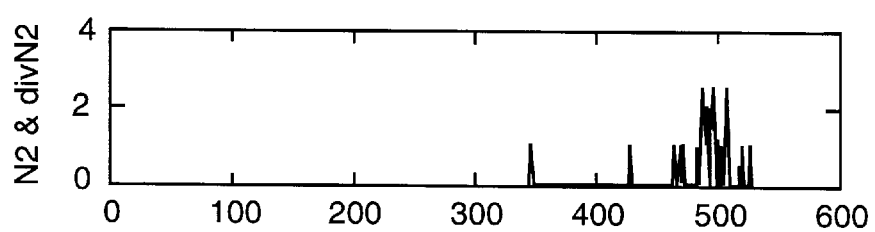
Figure 7D:
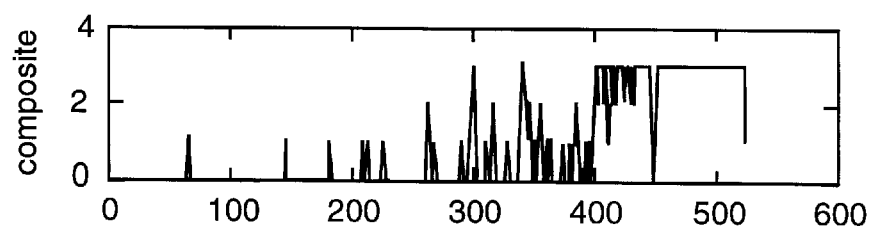

FIGS. 7a–7d show an example of plots used to determine the composite alert score. FIG. 7a shows a plot of the sub-alert vigilance values and alerts for the related variable pairs of dEGT and divEGT, FIG. 7b shows a plot of the sub-alert vigilance values and alerts for the related variable pairs of WF and divWF, and FIG. 7c shows a plot of the sub-alert vigilance values and alerts for the related variable pairs of N2 and divNT. The composite alert score generator 40 aggregates the alerts found at each individual directly and indirectly related feature pairs as shown in FIGS. 7a–7c. FIG. 7d shows a plot of the aggregate scores for the pairs dEGT and divEGT, WF and divWF, and N2 and divN2. The aggregation is performed by taking the maximum value of the individual vigilance values for the feature sets dEGT and divEGT, WF and divWF, and N2 and divN2.

Like the statistical property estimator 30, adaptor 31, normalizer 32 and classifier 33 of the multi-variate abnormal condition detector 28, the persistency checker 38 and composite alert score generator 40 of the alert evaluator 29 are embedded in a computer such as a workstation, however, other types of computers can be used such as a mainframe, a minicomputer, a microcomputer, or a supercomputer. The algorithms performed in the persistency checker 38 and composite alert score generator 40 are programmed in VBasic and MATLAB, but other languages such as JAVA may be used.

Figure 8:
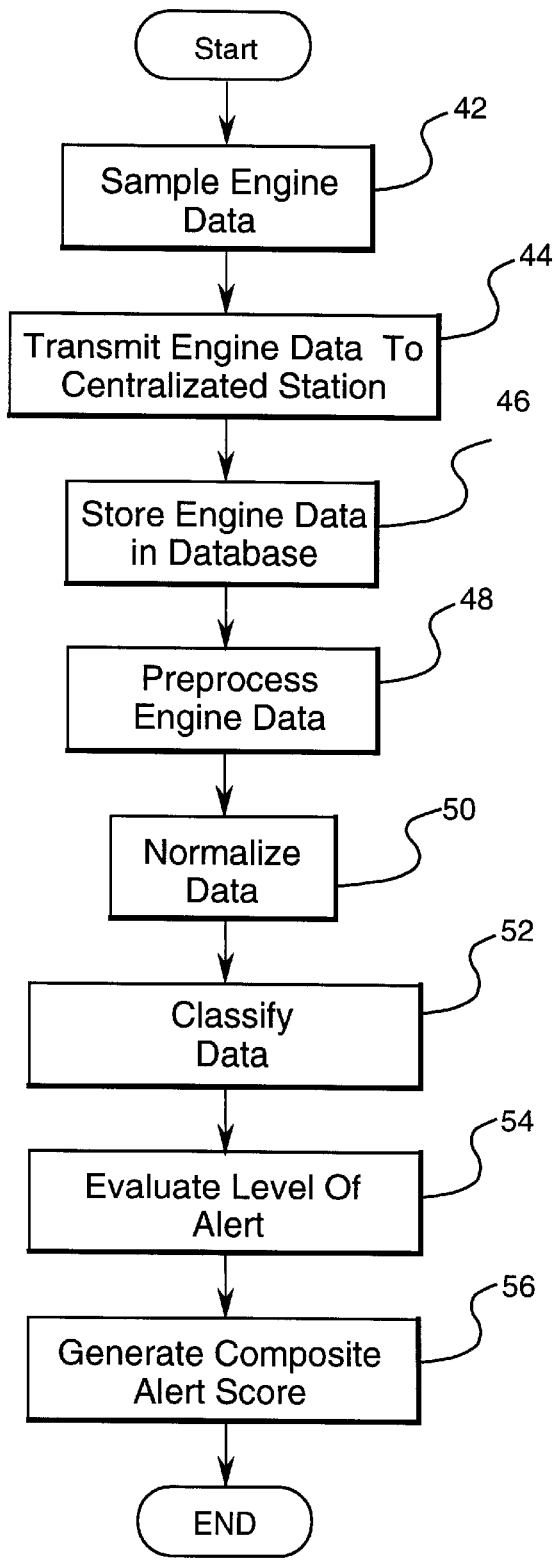
FIG. 8 shows a flow chart setting forth the steps performed by the aircraft engine monitoring system shown in FIG. 2.

FIG. 8 shows a flow chart setting forth the steps performed by the aircraft engine monitoring system 26 shown in FIG. 2. Engine data are sampled from the aircraft engine at 42 at different times of the flight such as during take-off, climb and cruise. The engine data are transmitted to a centralized data center system at 44 and stored in a database at 46. The data are preprocessed at 48 to ensure that there are no missing data entries for any particular variable and that the data are new. After preprocessing, the data are evaluated by the multi-variate abnormal condition detector 28. In particular, statistical properties from the engine data are estimated and smoothed to follow slow drifts that develop over time. In addition, the data are normalized individually for each engine variable by centering them around a chosen center point at 50. Next, the data are classified at 52 to either the normal class or abnormal class using the fuzzy knn algorithm. After the data have been classified, the data are evaluated at 54 to determine whether the data indicate an existing or impending fault. As mentioned earlier, this includes determining the vigilance level of the data for each of the related variables. Next, an alert score based on the vigilance level for each of the variables is generated and a composite alert score is aggregated at 56. The composite alert score is used to produce an alert report, which is used by an aircraft engine expert to suggest appropriate diagnostic and/or remedial actions. A schedule of actions is then prepared and used by maintenance personnel.

Figure 9:
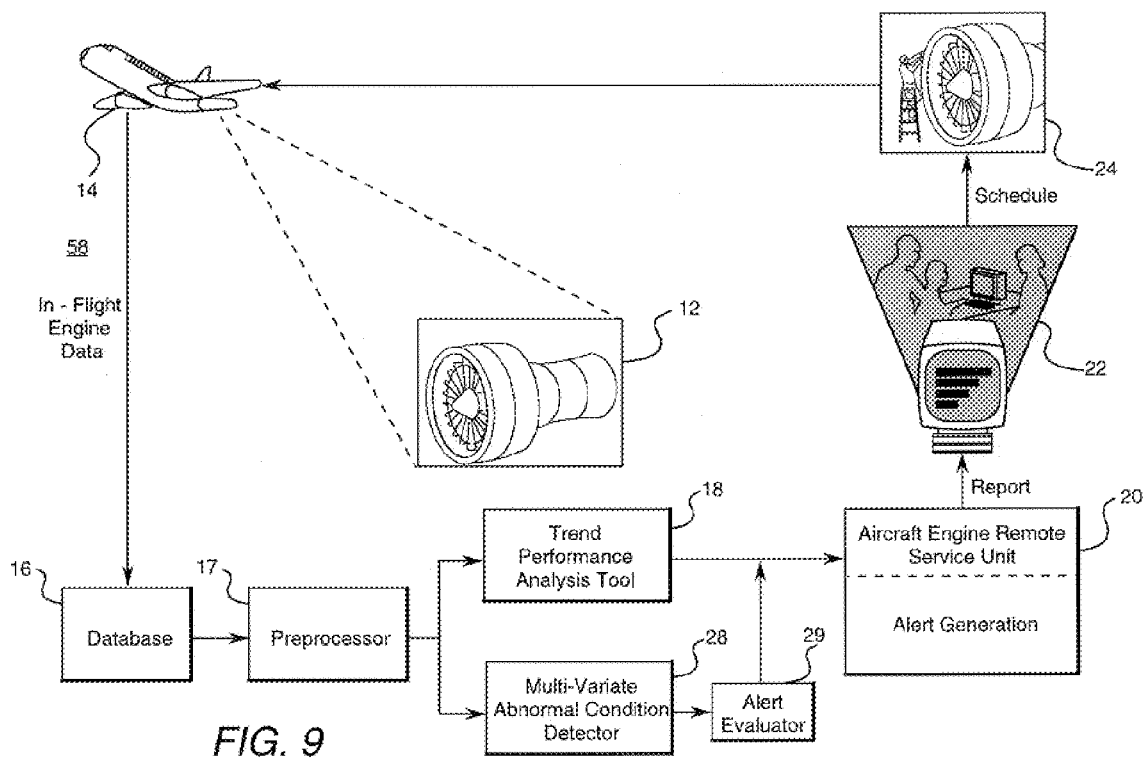
FIG. 9 shows a block diagram of a system for monitoring and maintaining an aircraft engine according to another embodiment of this invention.
Figure 10:
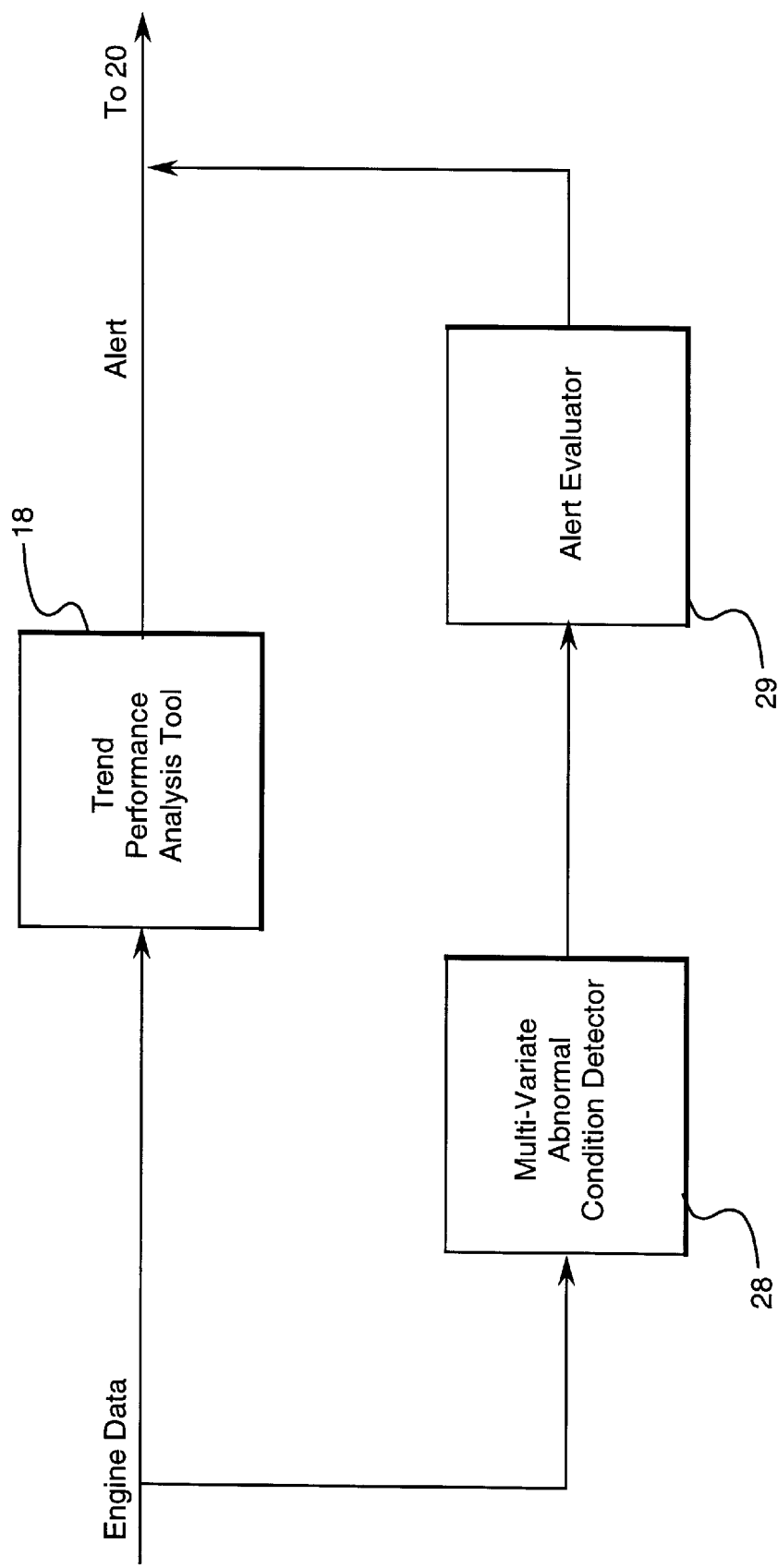
FIG. 10 shows a more detailed -view of the multi-variate abnormal condition detector and the alert evaluator used to validate alerts in the trend performance analysis tool.

In another embodiment of this invention, the multi-variate abnormal condition detector and alert evaluator are used in conjunction with the trend performance analysis tool to validate alerts generated therefrom. FIG. 9 shows a block diagram of a system 58 for monitoring and maintaining an aircraft engine according to this embodiment. In this embodiment, the multi-variate abnormal condition detector 28 and alert evaluator 29 work in parallel with the trend performance analysis tool 18, however, both may be integrated into the tool. As in the embodiment set forth in FIG. 2, the multi-variate abnormal condition detector 28 estimates statistical properties from the engine data obtained from the aircraft engine 12 and smoothes the data to follow slow drifts that develop over time. In addition, the multi-variate abnormal condition detector 28 normalizes the data and then uses the fuzzy knn algorithm to establish whether the data belong to either the normal class or the abnormal class. The alert evaluator 29 then evaluates the classified data and determines the level of vigilance. The alert evaluator uses the persistency checker and composite alert score generator in the aforementioned manner. FIG. 10 shows a more detailed view of the multi-variate abnormal condition detector 28 and the alert evaluator 29 used to validate alerts in the trend performance analysis tool.

Figure 11:
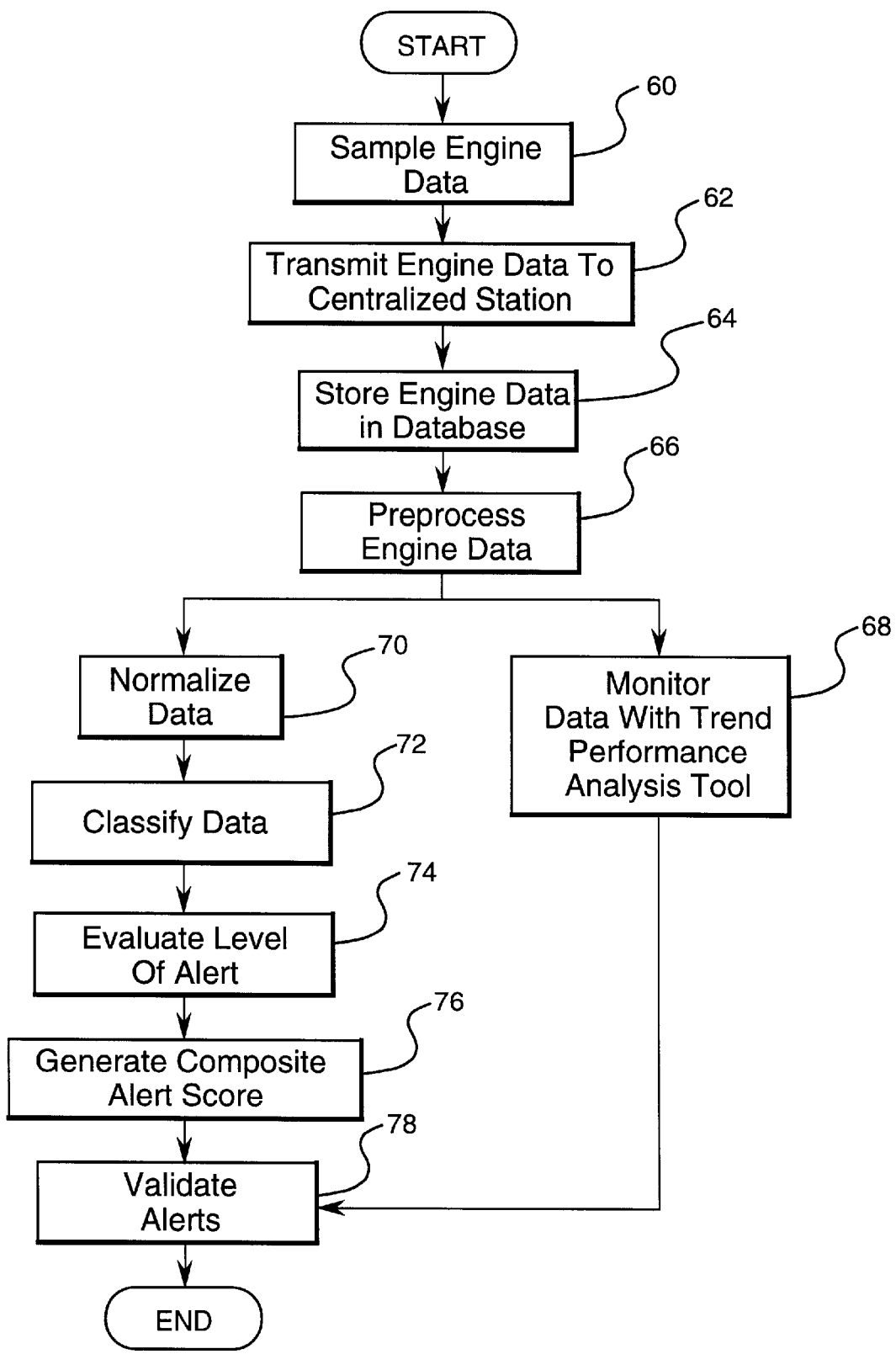
FIG. 11 shows a flow chart setting forth the steps performed by the system shown in FIG. 10.

FIG. 11 shows a flow chart setting forth the steps performed by the aircraft engine monitoring system 58 shown in FIG. 9. Engine data are sampled from the aircraft engine at 60 at different times of the flight such as during take-off, climb and cruise. The engine data are transmitted to a centralized data center system at 62 and stored in a database at 64. The data are preprocessed at 66 to ensure that there are no missing data entries for any particular variable and that the data are new. After preprocessing, the data are evaluated by the trend performance analysis tool at 68 where the data for each variable are compared against trending baseline data. If the data for a particular engine variable exceed a predetermined threshold limit, then the trend performance analysis tool issues an alert.

At the same time the engine data are being evaluated by the trend performance analysis tool, the data are simultaneously evaluated by the multi-variate abnormal condition detector and the alert evaluator. In particular, statistical properties from the engine data are estimated and smoothed to follow slow drifts that develop over time. In addition, the data are normalized individually for each engine variable at 70. Next, the data are classified at 72 to either the normal class or abnormal class using the fuzzy knn algorithm. After the data have been classified, the data are evaluated at 74 to determine the level of vigilance. Next, an alert score based on the vigilance level for each of the related variables is generated and a composite alert score is aggregated at 76. After the composite alert score has been determined, then the alerts from the trend performance tool are validated at 78 by comparing alert messages from the current trend performance analysis tool and the composite alert score. If both indicate an alert, then the alert is considered validated, otherwise it is not.

It is therefore apparent that there has been provided in accordance with the present invention, a system and method that provides improved alert generation for trend performance analysis. The invention has been described with reference to several embodiments, however, it will be appreciated that variations and modifications can be effected by a person of ordinary skill in the art without departing from the scope of the invention.

What is claimed is:

1. A system for generating an alert from data obtained from a process, comprising:

a normalizer for normalizing the data;

a classifier for classifying the normalized data in a multi-dimensional space defined for a plurality of variables in the process, the normalized data classified into a normal class or an abnormal class defined in the multi-dimensional variable space, wherein the normal class is indicative of normal operating conditions for the process and the abnormal class is indicative of potential alert conditions in the process;

an alert level evaluator for evaluating a vigilance level of the classified data for related variables, said alert level evaluator increasing the vigilance level following a suspicious data reading data classified in the abnormal class and decreasing the vigilance level following a data reading classified in the normal class; and an alert score generator for generating an alert score for each of the related variables according to the vigilance level.

2. The system according to claim 1, wherein said normalizer comprises means for centering the data about a selected center point.

3. The system according to claim 1, wherein said classifier uses a fuzzy knn algorithm to classify data in the normal class and the abnormal class.

4. The system according to claim 1, further comprising a statistical property estimator for estimating a plurality of statistical properties of the obtained data.

5. The system according to claim 4, wherein said statistical property estimator estimates a mean and standard deviation of the classified data.

6. The system according to claim 4, further comprising an adaptor for smoothing the statistical properties estimated by said statistical property estimator.

7. The system according to claim 1, wherein the alert condition is representative of at least one of a failure, a fault condition, or symptoms of an incipient failure condition.

8. The system according to claim 1, wherein the alert score generator aggregates each of the alert scores for the related variables into a composite score.

9. A system for generating an alert from data obtained from an aircraft engine process, comprising:

a normalizer for normalizing the data obtained from said aircraft engine process;

a classifier for classifying the normalized data in a multi-dimensional space defined for a plurality of variables in the aircraft engine process, the normalized data classified into a normal class or an abnormal class defined in the multi-dimensional variable space, wherein the normal class is indicative of normal operating conditions for the aircraft engine process and the abnormal class is indicative of potential alert conditions in the aircraft engine process;

an alert level evaluator for evaluating a vigilance level of the classified data for related variables, said alert level evaluator increasing the vigilance level following a suspicious data reading data classified in the abnormal class and decreasing the vigilance level following a data reading classified in the normal class; and an alert score generator for generating an alert score for each of the related variables according to the vigilance level.

10. The system according to claim 9, wherein said normalizer comprises means for centering the data about a selected center point.

11. The system according to claim 9, wherein said classifier uses a fuzzy knn algorithm to classify data in the normal class and the abnormal class.

12. The system according to claim 9, further comprising a statistical property estimator for estimating a plurality of statistical properties of the obtained data.

13. The system according to claim 12, wherein said statistical property estimator estimates a mean and standard deviation of the classified data.

14. The system according to claim 12, further comprising an adaptor for smoothing the statistical properties estimated by said statistical property estimator.

15. The system according to claim 9, wherein the alert condition is representative of at least one of a failure, a fault condition, or symptoms of an incipient failure condition.

16. The system according to claim 9, wherein the alert score generator aggregates each of the alert scores for the related variables into a composite score.

17. The system according to claim 9, wherein the multi-dimensional variable space comprises engine variables comprising exhaust gas temperature, fuel flow, core speed, exhaust gas temperature divergence, fuel flow divergence and core speed divergence.

18. A method for generating an alert from data obtained from a process, comprising:

normalizing the data;

classifying the normalized data in a multi-dimensional space defined for a plurality of variables in the process, the normalized data classified into a normal class or an abnormal class defined in the multi-dimensional variable space, wherein the normal class is indicative of normal operating conditions for the process and the abnormal class is indicative of potential alert conditions in the process;

evaluating a vigilance level of the classified data for related variables, said evaluating comprising increasing the vigilance level following a suspicious data reading data classified in the abnormal class and decreasing the vigilance level following a data reading classified in the normal class; and generating an alert score for each of the related variables according to the vigilance level.

19. The method according to claim 18, wherein said normalizing comprises centering the data about a selected center point.

20. The method according to claim 18, wherein said classifying comprises using a fuzzy knn algorithm to classify data in the normal class and the abnormal class.

21. The method according to claim 18, further comprising estimating a plurality of statistical properties of the obtained data.

22. The method according to claim 21, wherein said estimating estimates a mean and standard deviation of the classified data.

23. The method according to claim 20, further comprising smoothing the estimated statistical properties.

24. The method according to claim 18, wherein the alert is representative of at least one of a failure, a fault condition, or symptoms of an incipient failure condition.

25. The method according to claim 18, wherein said generating an alert score comprises aggregating each of the alert scores for the related variables into a composite score.

26. A method for generating an alert from data obtained from an aircraft engine process, comprising:
- normalizing the data obtained from said aircraft engine process;
- classifying the normalized data in a multi-dimensional space defined for a plurality of variables in the aircraft engine process, the normalized data classified into a normal class or an abnormal class defined in the multi-dimensional variable space, wherein the normal class is indicative of normal operating conditions for the aircraft engine process and the abnormal class is indicative of potential alert conditions in the aircraft engine process;
- evaluating a vigilance level of the classified data for related variables, said evaluating comprising increasing the vigilance level following a suspicious data reading data classified in the abnormal class and decreasing the vigilance level following a data reading classified in the normal class; and
- generating an alert score for each of the related variables according to the vigilance level.

27. The method according to claim 26, wherein said normalizing comprises centering the data about a selected center point.

28. The method according to claim 26, wherein said classifying comprises using a fuzzy knn algorithm to classify data in the normal class and the abnormal class.

29. The method according to claim 26, further comprising estimating a plurality of statistical properties of the data.

30. The method according to claim 29, wherein said estimating estimates a mean and standard deviation of the classified data.

31. The method according to claim 26, further comprising smoothing the estimated statistical properties.

32. The method according to claim 26, wherein the alert is representative of at-least one of a failure, a fault condition, or symptoms of an incipient failure condition.

33. The method according to claim 26, wherein said generating an alert score comprises aggregating each of the alert scores for the related variables into a composite score.

34. The method according to claim 26, wherein the multi-dimensional variable space comprises engine variables comprising exhaust gas temperature, fuel flow, core speed, exhaust gas temperature divergence, fuel flow divergence and core speed divergence.

35. A system for validating an alert generated from a trend performance analysis tool used to monitor data obtained from a process, comprising:
- a normalizer for normalizing the data monitored by the trend performance analysis tool;
- a classifier for classifying the normalized data in a multi-dimensional space defined for a plurality of variables in the process, the normalized data classified into a normal class or an abnormal class defined in the multi-dimensional variable space, wherein the normal class is indicative of normal operating conditions for the process and the abnormal class is indicative of alert conditions in the process;
- an alert level evaluator for evaluating a vigilance level of the classified data for related variables, said alert level evaluator increasing the vigilance level following a suspicious data reading data classified in the abnormal class and decreasing the vigilance level following a data reading classified in the normal class; and
- an alert score generator for generating an alert score for each of the related variables according to the vigilance level, wherein the alert generated from the trend performance analysis tool is valid if the alert score satisfies a predetermined score.

36. The system according to claim 35, wherein said normalizer comprises means for centering the data about a selected center point.

37. The system according to claim 35, wherein said classifier uses a fuzzy knn algorithm to classify data in the normal class and the abnormal class.

38. The system according to claim 35, further comprising a statistical property estimator for estimating a plurality of statistical properties of the data.

39. The system according to claim 38, wherein said statistical property estimator estimates a mean and standard deviation of the classified data.

40. The system according to claim 38, further comprising an adaptor for smoothing the statistical properties estimated by said statistical property estimator.

41. The system according to claim 35, wherein the alert condition is representative of at least one of a failure, a fault condition, or symptoms of an incipient failure condition.

42. The system according to claim 35, wherein the alert score generator aggregates each of the alert scores for the related variables into a composite score.

43. The system according to claim 35, further comprising an alert validator that compares the alert from the trend performance analysis tool with the alert score.

44. A system for validating an alert generated from a trend performance analysis tool used to monitor data obtained from an aircraft engine process, comprising:
- a normalizer for normalizing data obtained from said aircraft engine process and monitored by the trend performance analysis tool;
- a classifier for classifying the normalized data in a multi-dimensional space defined for a plurality of variables in the aircraft engine process, the normalized data classified into a normal class or an abnormal class defined in the multi-dimensional variable space, wherein the normal class is indicative of normal operating conditions for the aircraft engine process and the abnormal class is indicative of potential alert conditions in the aircraft engine process;
- an alert level evaluator for evaluating a vigilance level of the classified data for related variables, said alert level evaluator increasing the vigilance level following a suspicious data reading data classified in the abnormal class and decreasing the vigilance level following a data reading classified in the normal class; and
- an alert score generator for generating an alert score for each of the related variables according to the vigilance level, wherein the alert generated from the trend performance analysis tool is valid if the alert score satisfies a predetermined score.

45. The system according to claim 44, wherein said normalizer comprises means for centering the data about a selected center point.

46. The system according to claim 44, wherein said classifier uses a fuzzy knn algorithm to classify data in the normal class and the abnormal class.

47. The system according to claim 44, further comprising a statistical property estimator for estimating a plurality of statistical properties of the data.

48. The system according to claim 47, wherein said statistical property estimator estimates a mean and standard deviation of the classified data.

49. The system according to claim 47, further comprising an adaptor for smoothing the statistical properties estimated by said statistical property estimator.

50. The system according to claim 44, wherein the alert condition is representative of at least one of a failure, a fault condition, or symptoms of an incipient failure condition.

51. The system according to claim 44, wherein the alert score generator aggregates each of the alert scores for the related variables into a composite score.

52. The system according to claim 44, wherein the multi-dimensional variable space comprises engine variables comprising exhaust gas temperature, fuel flow, core speed, exhaust gas temperature divergence, fuel flow divergence and core speed divergence.

53. The system according to claim 44, further comprising an alert validator that compares the alert from the trend performance analysis tool with the alert score.

54. A method for validating an alert generated from a trend performance analysis tool used to monitor data obtained from a process, comprising:

normalizing the data monitored by the trend performance analysis tool;

classifying the normalized data in a multi-dimensional space defined for a plurality of variables in the process, the normalized data classified into a normal class or an abnormal class defined in the multi-dimensional variable space, wherein the normal class is indicative of normal operating conditions for the process and the abnormal class is indicative of potential alert conditions in the process;

evaluating a vigilance level of the classified data for related variables, said evaluating comprising increasing the vigilance level following a suspicious data reading data classified in the abnormal class and decreasing the vigilance level following a data reading classified in the normal class; and generating an alert score for each of the related variables according to the vigilance level, wherein the alert generated from the trend performance analysis tool is valid if the alert score satisfies a predetermined score.

55. The method according to claim 54, wherein said normalizing comprises centering the data about a selected center point.

56. The method according to claim 54, wherein said classifying comprises using a fuzzy knn algorithm to classify data in the normal class and the abnormal class.

57. The method according to claim 54, further comprising estimating a plurality of statistical properties of the data.

58. The method according to claim 57, wherein said estimating estimates a mean and standard deviation of the classified data.

59. The method according to claim 57, further comprising smoothing the estimated statistical properties.

60. The method according to claim 54 wherein the alert is representative of at least one of a failure, a fault condition, or symptoms of an incipient failure condition.

61. The method according to claim 54, wherein said generating an alert score comprises aggregating each of the alert scores for the related variables into a composite score.

62. The method according to claim 54, further comprising comparing the alert from the trend performance analysis tool with the alert score.

63. A method for validating an alert generated from a trend performance analysis tool used to monitor data obtained from an aircraft engine process, comprising:

normalizing the data obtained from said aircraft engine process and monitored by the trend performance analysis tool;

classifying the normalized data in a multi-dimensional space defined for a plurality of variables in the aircraft engine process, the normalized data classified into a normal class or an abnormal class defined in the multi-dimensional variable space, wherein the normal class is indicative of normal operating conditions for the aircraft engine process and the abnormal class is indicative of potential alert conditions in the aircraft engine process;

evaluating a vigilance level of the classified data for related variables, said evaluating comprising increasing the vigilance level following a suspicious data reading data classified in the abnormal class and decreasing the vigilance level following a data reading classified in the normal class; and generating an alert score for each of the related variables according to the vigilance level, wherein the alert generated from the trend performance analysis tool is valid if the alert score satisfies a predetermined score.

64. The method according to claim 63, wherein said normalizing comprises centering the data about a selected center point.

65. The method according to claim 63, wherein said classifying comprises using a fuzzy knn algorithm to classify data in the normal class and the abnormal class.

66. The method according to claim 63, further comprising estimating a plurality of statistical properties of the data.

67. The method according to claim 66, wherein said estimating estimates a mean and standard deviation of the classified data.

68. The method according to claim 66, further comprising smoothing the estimated statistical properties.

69. The method according to claim 63, wherein the alert is representative of at least one of a failure, a fault condition, or symptoms of an incipient failure condition.

70. The method according to claim 63, wherein said generating an alert score comprises aggregating each of the alert scores for the related variables into a composite score.

71. The method according to claim 63, wherein the multi-dimensional variable space comprises engine variables comprising exhaust gas temperature, fuel flow, core speed, exhaust gas temperature divergence, fuel flow divergence and core speed divergence.

72. The method according to claim 63, further comprising comparing the alert from the trend performance analysis tool with the alert score.

* * * * *